United States Patent [19]

Ray et al.

[11] 4,053,801

[45] Oct. 11, 1977

[54] ARMATURE STRUCTURE FOR PERMANENT MAGENT d-c MOTOR

[75] Inventors: Glen Ray, Big Bend; Leonard W. Leniewski, New Berlin, both of Wis.

[73] Assignee: Allen-Bradley Company, Milwaukee, Wis.

[21] Appl. No.: 625,634

[22] Filed: Oct. 24, 1975

[51] Int. Cl.$^2$ .............................................. H02K 1/06
[52] U.S. Cl. .................................. 310/216; 310/154; 310/261
[58] Field of Search ............... 310/42, 64, 65, 46 MM, 310/154, 216–218, 261, 163

[56] References Cited

U.S. PATENT DOCUMENTS

| 249,148 | 11/1881 | Long | 310/65 X |
|---|---|---|---|
| 831,625 | 9/1906 | McElroy | 310/65 |
| 2,860,289 | 11/1958 | Verardo | 310/216 X |
| 3,062,979 | 11/1962 | Jarret et al. | 310/163 X |
| 3,277,324 | 10/1966 | Beaudoin et al. | 310/154 |

*Primary Examiner*—Donovan F. Duggan
*Attorney, Agent, or Firm*—Quarles & Brady

[57] ABSTRACT

A permanent magnet d-c motor is described in which the weight and cost of the armature is substantially reduced by removing some of the steel laminations. To maintain performance, the remaining laminations are spaced apart so that the axial length of the armature remains unchanged and the width of the armature winding slots are kept to a minimum to prevent magnetic saturation within the armature teeth. Two means for spacing the laminations are described.

2 Claims, 5 Drawing Figures

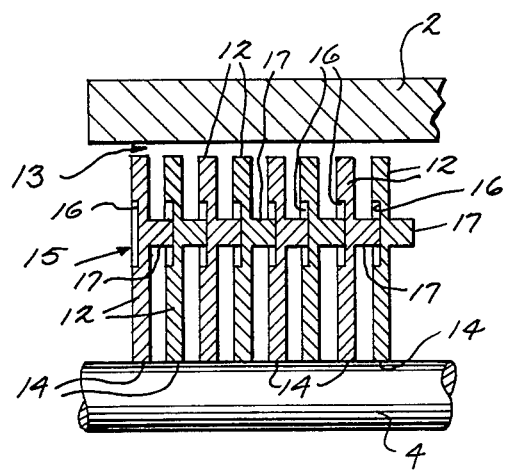
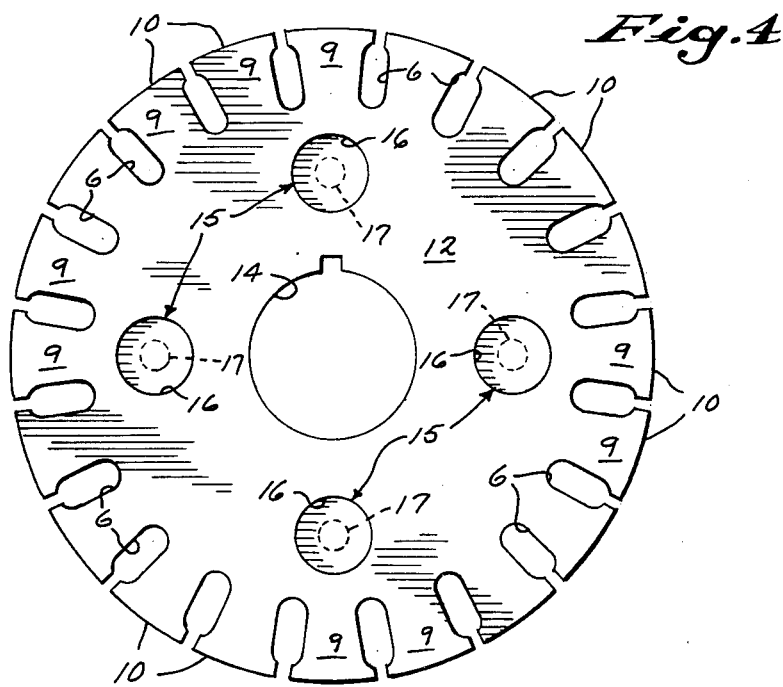
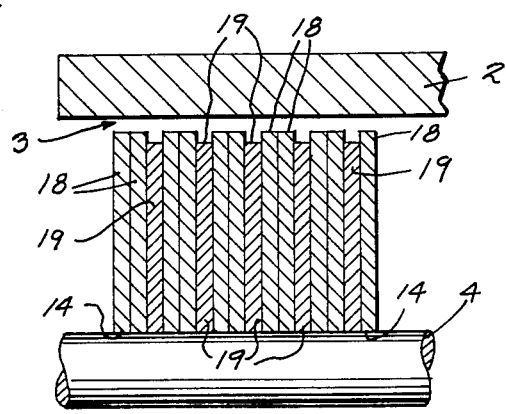

ARMATURE STRUCTURE FOR PERMANENT MAGNET d-c MOTOR

BACKGROUND OF THE INVENTION

The field of the invention is permanent magnet dynamos, and more particularly, electric motors having permanent magnet pole pieces.

The extraordinary magnetic properties of ceramic magnetic materials, such as the hard ferrites, have given them wide application in pole pieces for permanent magnet electric motors. Such pole pieces are typically disposed around the interior of a circular cylindrical sleeve made of a high permeability material, and an armature is journaled for rotation within the sleeve and driven by the interaction of the magnetic fields generated by the pole pieces and the armature windings. The armature is generally circular cylindrical in shape and is formed by stacking together plates, known as laminations, made of a high permeability material such as steel. Such armature structures add significantly to the overall weight and cost of such motors.

SUMMARY OF THE INVENTION

The invention relates to an improved armature structure for a permanent magnet dynamo, and more particularly, to an armature in which the number of armature plates are significantly reduced by spacing them apart. Such spacing may be provided by deforming the armature plates to form air spaces between them or by inserting an inexpensive lightweight spacer material between successive armature plates. In either case, the weight and cost of the armature for any given dynamo may be significantly reduced without significantly diminishing the performance of the machine.

A general object of the present invention is to reduce the amount of high permeability material in the armature of the permanent magnet dynamo without significantly diminishing its performance characteristics. It has been discovered that for many permanent magnet dynamos, the amount of steel needed in the armature to maintain the flux density below saturation levels is far less than that provided in prior structures. Because the diameter of the armature is essentially fixed by other design criteria, it would at first appear that a substantial reduction in the amount of steel could be accomplished by shortening the axial length of the armature. When the armature is thus shortened a significant amount, however, the permanent magnet pole pieces extend beyond the ends of the armature and an increase in flux leakage occurs which results in a significant drop in machine performance. The present invention provides a solution to this dilemma by removing a selected number of armature plates and spacing the remaining stacked armature plates such that the overall axial length of the armature remains unchanged.

A more specific object of the invention is to provide a lightweight armature structure for a permanent magnet motor. The armature plates are spaced apart either by spacer plates made of a lightweight and inexpensive material, or are spaced apart by deformations formed on their opposing surfaces. In either case, a portion of the relatively heavy and expensive high permeability material is replaced.

Another specific object of the invention is to maximize the amount of high permeability armature material which can thus be replaced. The armature plates are generally circular in shape and each has a series of slots disposed around its periphery which receive the armature windings. For a given set of performance specifications, the diameter of the armature plates and the minimum number and size of the armature winding slots are substantially fixed. The flux density in each armature plate is a maximum in the teeth portions which are formed between the winding slots, and it is a teaching of the present invention that the width of these teeth should be maximized for any given set of performance specifications. By doing so, the number of armature plates required to maintain the flux density below saturation levels is reduced with the result that more of the armature plates can be removed.

The foregoing and other objects and advantages of the invention will appear from the following description. In the description reference is made to the accompanying drawings which form a part hereof and in which there is shown by way of illustration a preferred embodiment of the invention. Such embodiment does not necessarily, however, represent the full scope of the invention, and reference is made to the claims herein for interpreting the breadth of the invention.

BRIEF DESCRIPTION OF THE DRAWINGS

FIG. 3 is a partial view in section of the first preferred embodiment of the armature structure of the present invention, FIG. 4 is an elevation view of an armature plate which forms part of the armature structure of FIG. 3 and FIG. 5 is a partial view in section of an alternative embodiment of the armature structure of the present invention.

DESCRIPTION OF THE PREFERRED EMBODIMENTS

Figure 1:
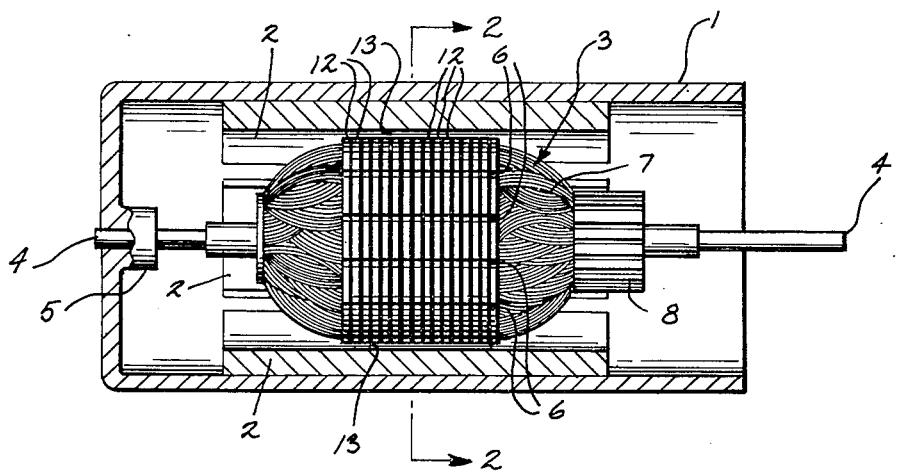
FIG. 1 is a view partly in section of a permanent magnet motor embodying the present invention taken along the line 1—1 in FIG. 2.
Figure 2:
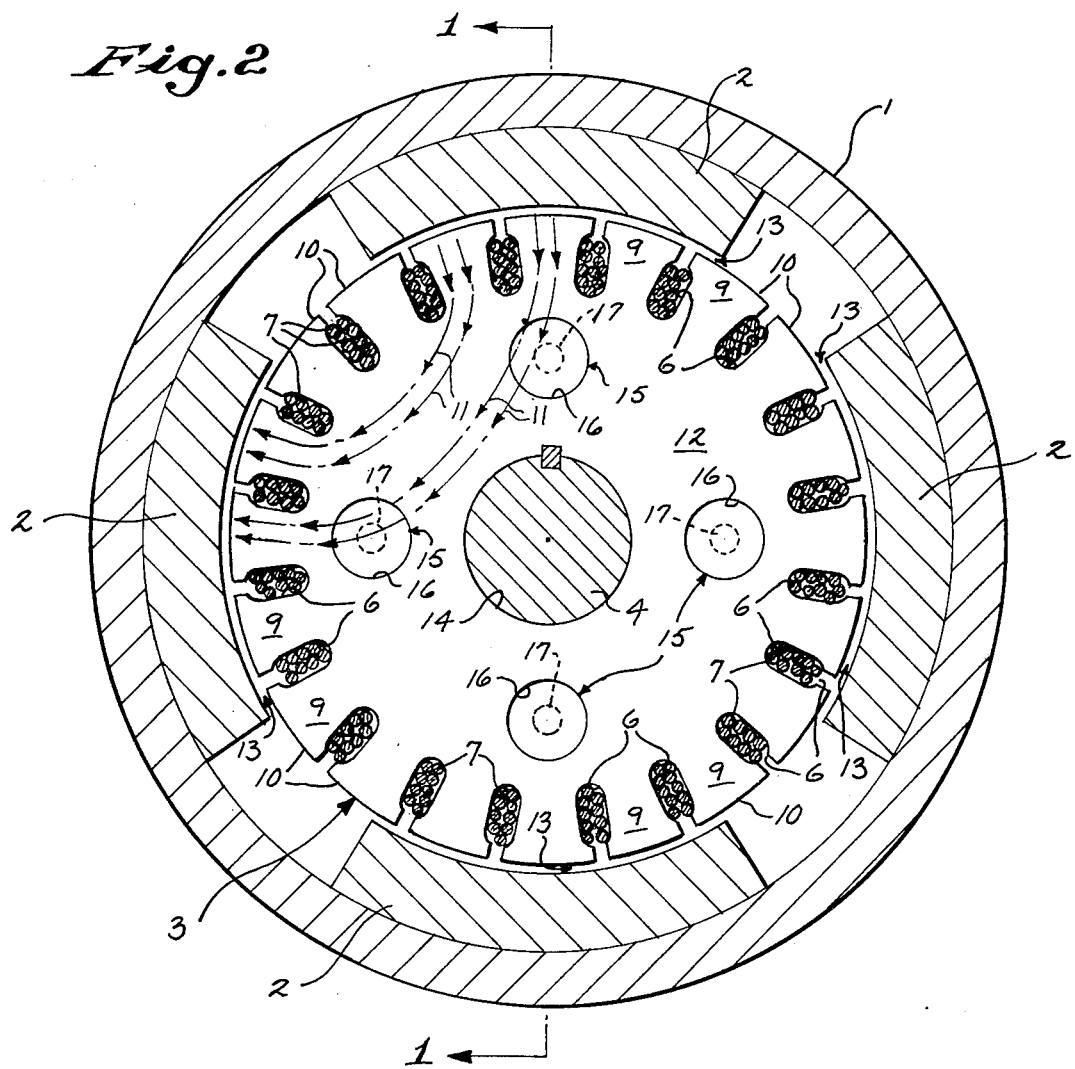
FIG. 2 is a view in section taken along the line 2—2 in FIG. 1 of the preferred embodiment of the present invention shown in FIG. 1.

Referring to FIGS. 1 and 2, a permanent magnet motor is shown and includes a circular cylindrical flux return sleeve 1 which is made of a high permeability material such as low carbon steel. A set of four pole pieces 2, each in the form of a circular cylindrical segment, are attached to the inner surface of the sleeve 1 and circumferentially positioned equidistantly thereabout. Each has a back face which mates against the inner surface of the sleeve 1 and a front face which is directed radially inward to provide a magnetic pole face for the dynamo. Each pole piece 2 is preferrably made up of a magnetically hard, oriented ferrite, ceramic, or metal oxide material that exhibits desirable magnetic flux values and has a low permeability, approximately equal to that of air. Alnico magnets may also be used, however, their application to motors is less desirable.

An armature 3 is mounted to rotate within the cavity defined by the arcuate shaped pole pieces 2. The armature 3 is carried on a shaft 4 which is journaled by an end bearing 5 mounted in an end bell 9 which is housed by the sleeve 1. It is journaled at its other end in a bearing (not shown) mounted on a cap (not shown) which is fastened to the other end of the motor sleeve 1. The armature 3 has a series of evenly spaced slots 6 which extend in the axial direction along its outer circular cylindrical surface. These slots 6 receive copper armature windings 7 which terminate at a commutator 8 that is carried by the shaft 4 and disposed at one end of the armature 3. The armature windings 7 are electrically energized through brushes (not shown) which contact the commutator 8 and the resulting magnetic field coacts with the magnetic field generated by the pole pieces 2 to impart rotary motion to the armature 3.

Referring particularly to FIG. 2, the slots 6 which receive the armature windings 7 form a series of teeth 9 that are spaced equidistantly around the circumference of the armature 3. The teeth 9 extend radially outward from the center of the armature 3 to present arcuate surfaces 10 that face the inner surfaces of the pole pieces 2 across a fixed air gap 13. The teeth 9 run the entire axial length of the armature 3 and they cooperate with the central portion of the armature 3 to form a low reluctance magnetic circuit which conducts magnetic flux between adjacent pole pieces 2 as illustrated by the vectors 11.

Although the armature 3 could be formed from a single piece of high permeability material, to reduce iron core losses and to facilitate construction of the armature 3, it is customary in the art to construct it by stacking together a series of identical, relatively thin plates. These armature plates are stacked, or laminated, one against the other until the desired axial length is obtained. The armature which results from such prior teachings contains a substantial amount of heavy and expensive high permeability material which, along with the armature windings 7 and commutator 8, comprise a significant part of the overall weight of the motor.

Permanent magnet motors are used quite extensively in the automotive industry to power auxiliary equipment such as windshield wipers, window lifts, heater blowers, air conditioning equipment and other automotive accessories. The need for reducing the weight of automobiles has given rise to an increased demand for electric motors of lighter weight, and it is this objective which is accomplished in the present invention by reducing the weight of the motor armature.

The general geometry and the size of a permanent magnet electric motor are determined by the operating specifications. For any given torque-speed requirement the total area of the pole faces on the magnetic pieces 2 is fixed by the minimum total flux which the magnets must generate. Although a tradeoff between the outside diameter of the motor and its axial length is possible, these dimensions are eventually fixed by such considerations as the available mounting space. In other words, for any given set of motor specifications, the minimum axial length of the pole pieces 2 will be established as well as the minimum diameter of the cavity in which the armature 3 is disposed. It is a discovery of the present invention that unlike prior structures, the armature 3 need not be constructed as a solid piece of expensive and heavy high permeability material. That is, the cavity defined by the pole pieces 2 need not be filled with steel or other high permeability material, but instead, a portion of this cavity can be filled with a relatively low permeability material such as air, plastic, or paperboard.

Referring particularly to FIGS. 3 and 4, in the first preferred embodiment of the invention the armature 3 is formed by stacking together a set of identical armature plates 12. Each armature plate 12 is formed in a stamping process from a sheet of steel having a thickness of approximately 50 mils. Each armature plate 12 includes a keyed circular central opening 14 at its center for receiving the armature shaft 4 and it includes a set of four coined regions 15 which serve as means for spacing the adjacent armature plates 12 from one another. The four coined regions 15 are positioned equidistantly from one another about the circumference of the armature plate 12 and each includes a shallow, but relatively large diameter recess 16 formed on one side of the armature plate 12 and a relatively small diameter protrusion 17 formed on the other side of the armature plate 12. When stacked together on the keyed shaft 4, the protrusions 17 on each armature plate are received in the recesses 16 of an adjacent armature plate 12 and they serve to axially separate the two adjacent armature plates 12 at a predetermined spacing. The amount of spacing between adjacent armature plates 12 is thus determined by the difference between the axial extent of the protrusions 17 and the depth of the recesses 16 into which they are received. In the preferred embodiment shown in FIG. 3, the spacing between the armature plates 12 is substantially equal to their thickness; however, in fractional and low horsepower motors typically used to run automotive accessories, the spacing may range from 15 to 60 mils.

An alternative means for spacing the armature plates is illustrated in FIG. 5. In this embodiment of the invention armature plates 18 are stamped from sheet metal and have a shape identical to the armature plates 12 described above. Coined regions are not formed on the armature plates 18, however, and instead, spacer plates 19 are inserted periodically between the stacked armature plates 18. The spacer plates 19 are cut from a material such as fiberboard and have a shape and thickness substantially identical to the armature plates 19. In the embodiment shown in FIG. 5, one spacer plate 19 for every two armature plates 18 is shown, however, this ratio and the relative thickness of the plates may be changed to provide both the proper amount of high permeability material in the armature 3 and to provide the desired axial length.

Even using armature plates of prior art structures, a substantial reduction in the number of such plates can be made using the above described teachings. It is a further teaching of the present invention, however, that even further reductions in the amount of high permeability armature material can be made by properly shaping the armature plates.

Referring particularly to FIG. 2, the armature 3 provides a low reluctance path for magnetic flux which flows between adjacent pole pieces 2. It should be apparent from this drawing that the flux density in the armature 3 is a maximum in the teeth 9 and therefore saturation of the armature can be avoided by preventing saturation at these points. The performance specifications (i.e., the speed-torque curve) determine the total magnet flux ($\phi m$) which is to be conducted. The performance specifications also determine the size of the cavity in which the armature 3 is disposed and the minimum size and number of slots 6 needed to accommodate the armature windings 7. It is a teaching of the present invention that given such design constraints the circumferential width of the teeth 9 should be maximized, or in other words, that the slots 6 should be kept as narrow as possible.

The minimum armature tooth cross-sectional area required to prevent saturation of the teeth 9 is expressed as follows:

$$A_c = \phi m / B_m$$

where:

$A_c$ = the cross-sectional steel area of all the teeth which are conducting flux from a single magnet pole $\phi m$ = total magnet flux per pole $B_m$ = maximum flux density allowed in armture tooth plate material The minimum cross-sectional area of the teeth is thus established and because the number of teeth and their circumferential width have already been determined, the axial extent of the high permeability armature material can be calculated as follows:

$$L = A_c/n \cdot t_w = \phi m/B_m \cdot n \cdot t_w$$

where:

L = axial length of high permeability material required in armature stack n = number of teeth conducting flux per pole $t_w$ = circumferential width of each tooth at its narrowest point The length L is typically much less than the axial length of the permanent magnet pole pieces 2 and to minimize flux leakage, one of the above described spacer means is used to spread out the required number of armature plates 12 to obtain the proper length.

It should be apparent to those skilled in the art that the total amount of spacing required to extend the axial length of the armature 3 will be determined by a number of design factors. The total spacing can be divided into smaller spaces between each armature plate as shown in FIG. 3 or it may be divided into fewer, but larger, spaces between groups of armature plates as shown in FIG. 5. Although many variations are thus possible, it has been found that when the spacing between adjacent armature plates exceeds two times the air gap, the loss in total magnet flux becomes an important consideration. As a general rule, therefore, the best performance is assured by dividing the total spacing into the smallest economically feasible increments and spacing between armature plates substantially the same as the length of the air gap is preferred.

We claim:

1. A permanent magnet motor, the combination comprising:

a sleeve made of a high permeability material and having a circular cylindrical inner surface;

a set of pole pieces made of a permanent magnet material and fastened to the inner surface of said sleeve and positioned equidistantly around its circumference, each of said pole pieces extending along the length of the sleeve and fixed distance to define a pole face which is directed radially inward toward a central axis, said pole faces defining a circular cylindrical cavity;

a shaft extending along said central axis through said sleeve and being journaled for rotation about said axis;

a set of armature plates made of a high permeability material, said armature plates having a circular shape and each being fastened to the shaft for rotation about said central axis in a plane substantially perpendicular to said axis, and said armature plates being spaced apart along said shaft to substantially fill the circular cylindrical cavity defined by said pole faces; and in which the spacing between armature plates is substantially equal to the length of the air gap formed between the pole faces and the circular outer perimeter of each armature plate.

2. A permanent magnet motor, the combination comprising:

a sleeve made of a high permeability material and having a circular cylindrical inner surface;

a set of pole pieces made of a permanent magnet material and fastened to the inner surface of said sleeve and positioned equidistantly around its circumference, each of said pole pieces extending along the length of the sleeve a fixed distance to define a pole face which is directed radially inward toward a central axis, said pole faces defining a circular cylindrical cavity;

a shaft extending along said central axis through said sleeve and being journaled for rotation about said axis;

a set of armature plates made of a high permeability material, said armature plates having a circular shape and each being fastened to the shaft for rotation about said central axis in a plane substantially perpendicular to said axis, and said armature plates being spaced apart along said shaft to substantially fill the circular cylindrical cavity defined by said pole faces; and in which the thickness of each armature plate is in the range of 15 to 60 mils and the spacing between armature plates is in the range of 15 to 60 mils.

* * * * *